Sept. 19, 1933.   C. HAGEN ET AL   1,927,313
APPARATUS FOR DRYING STARCH
Filed July 13, 1931   6 Sheets-Sheet 6

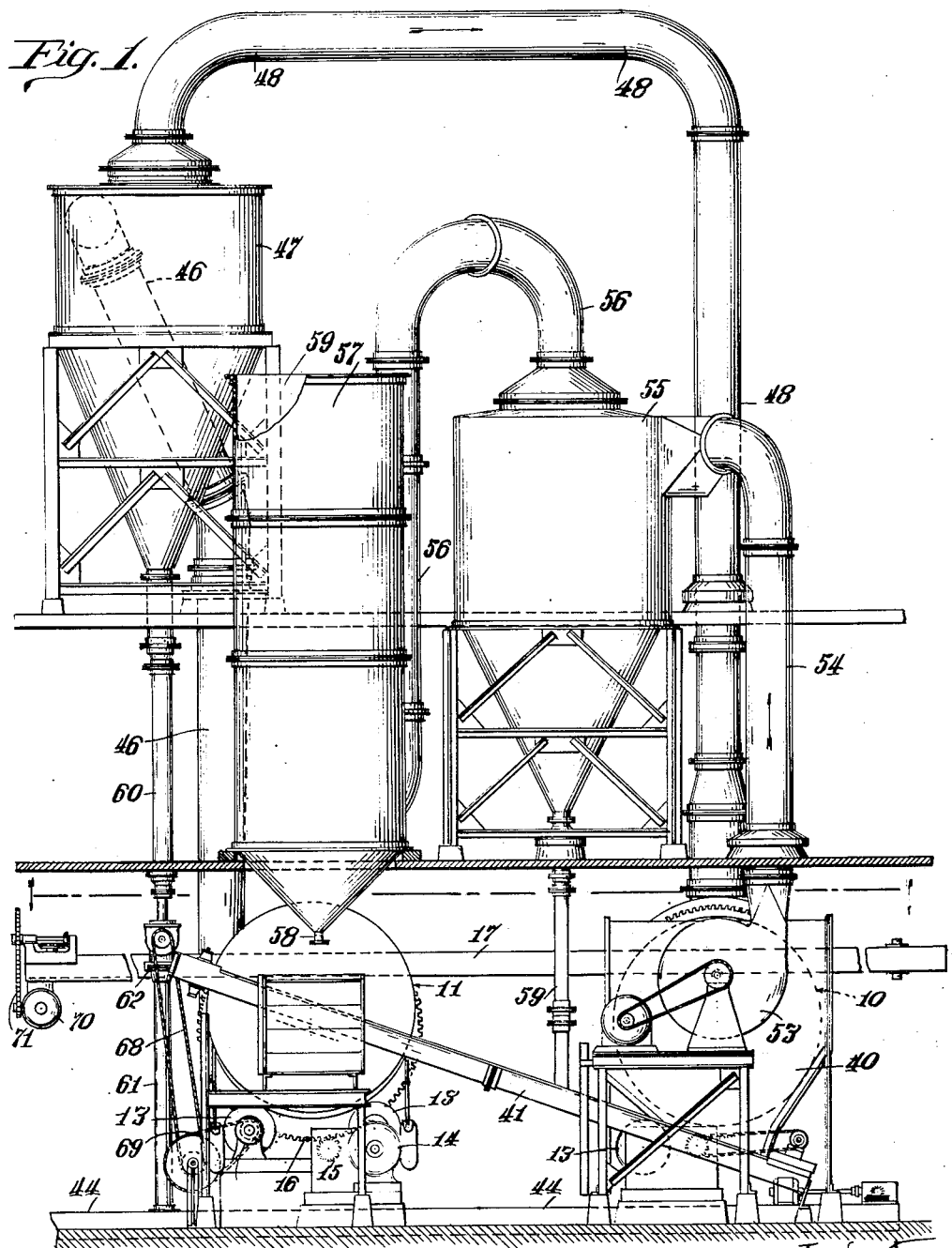

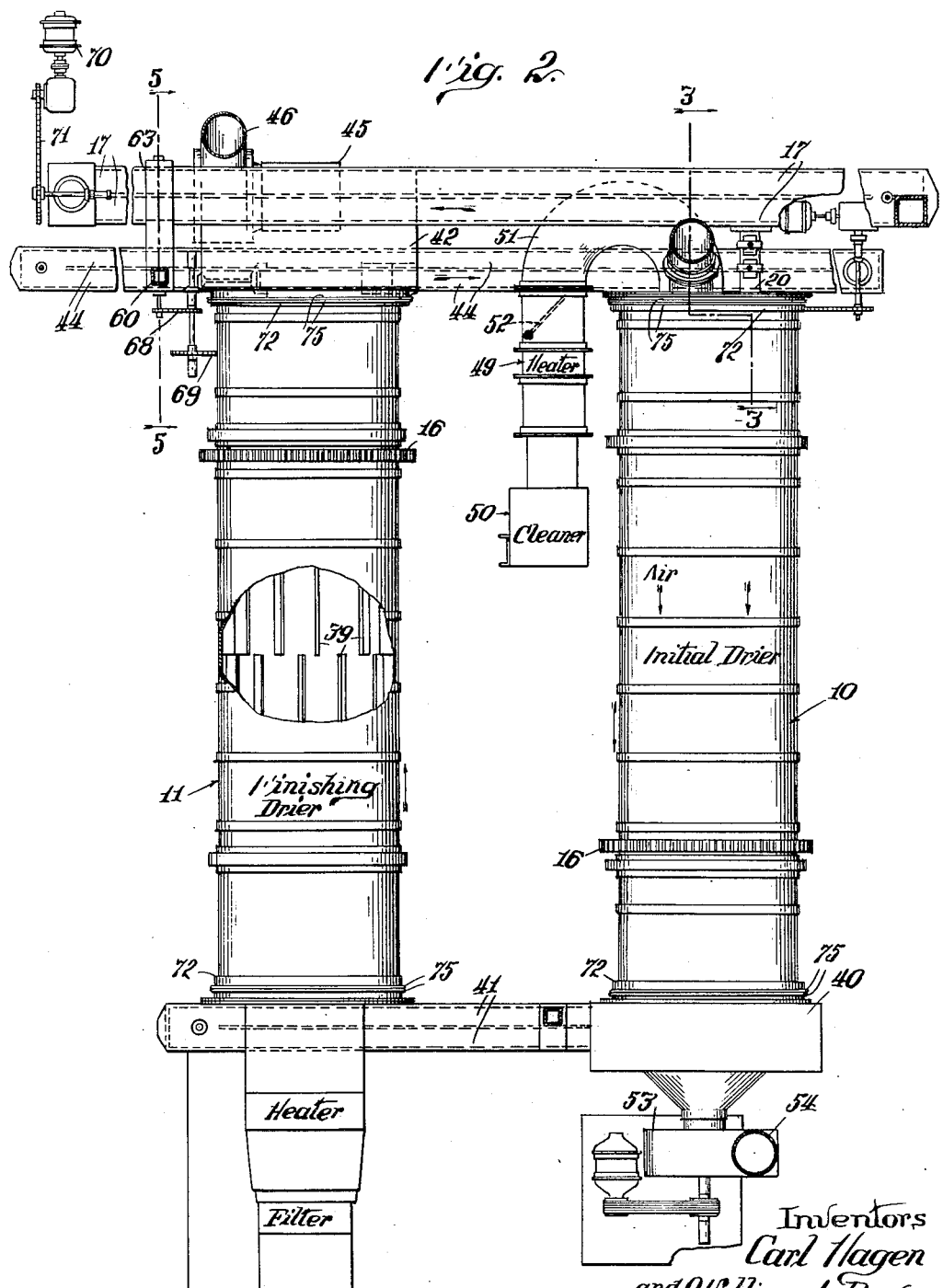

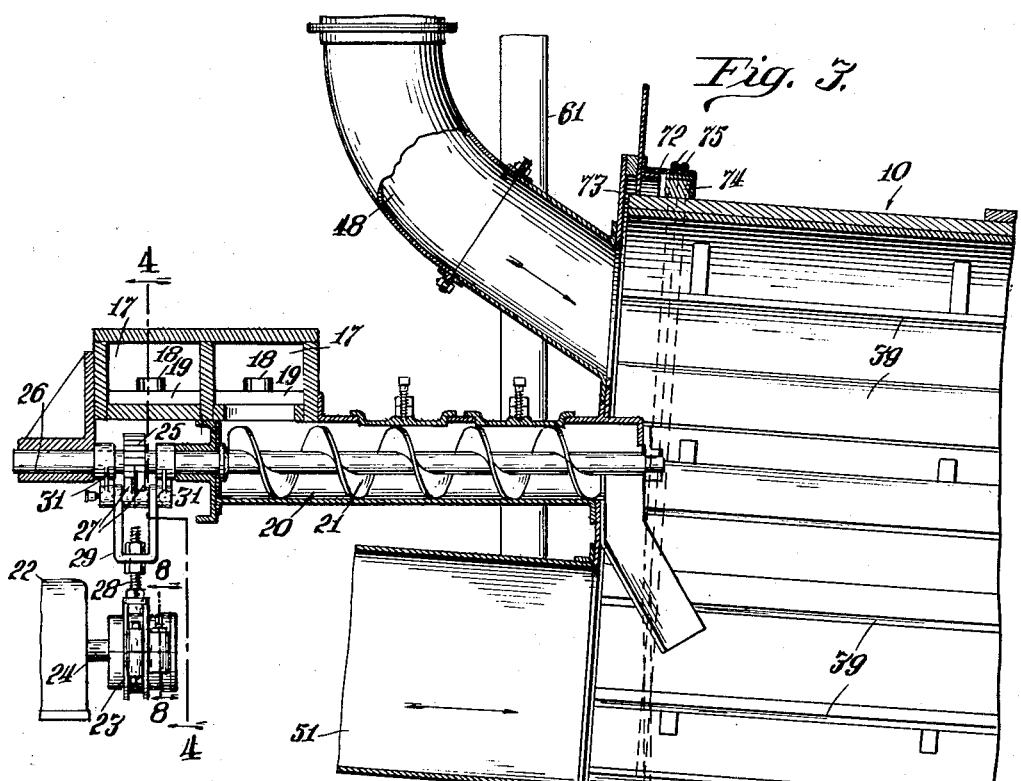
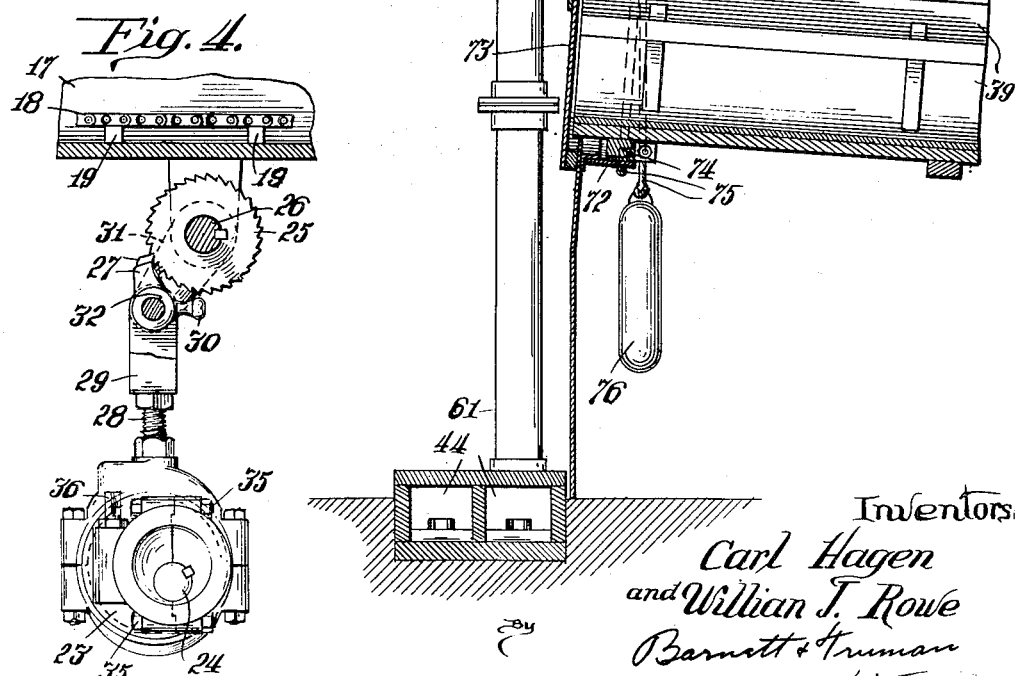

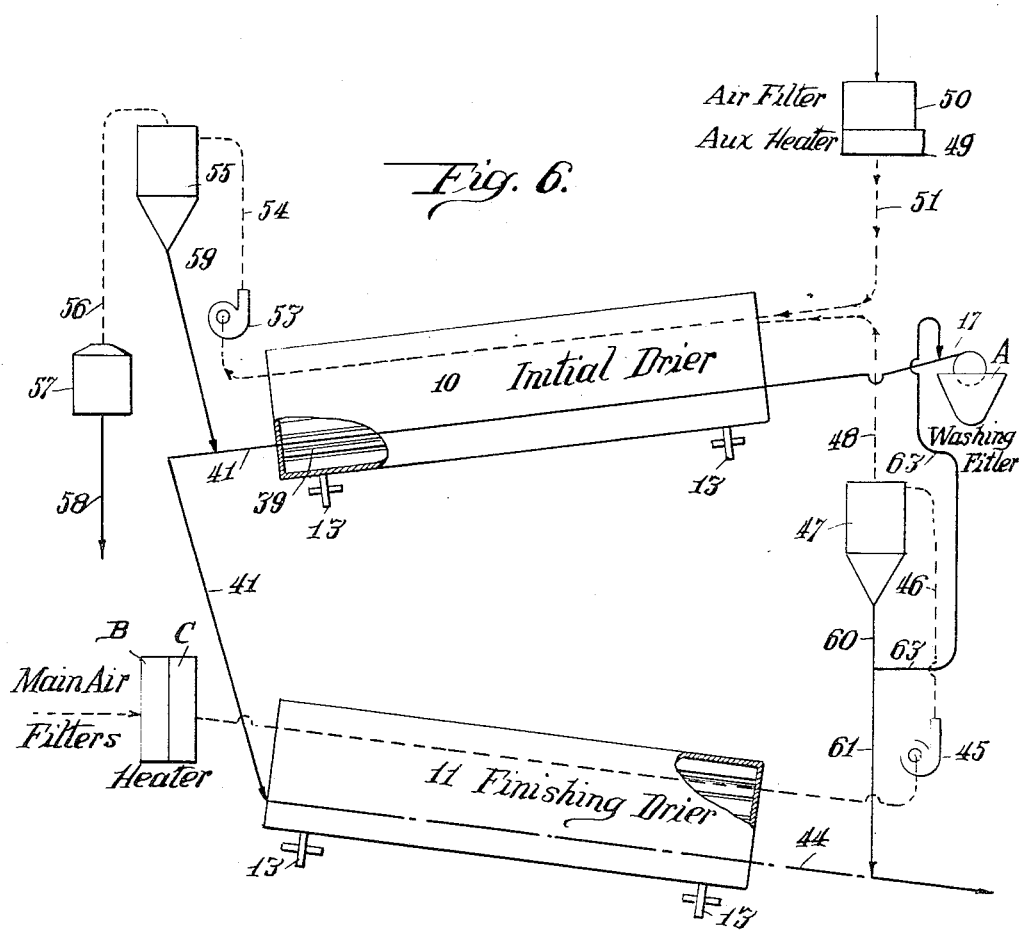
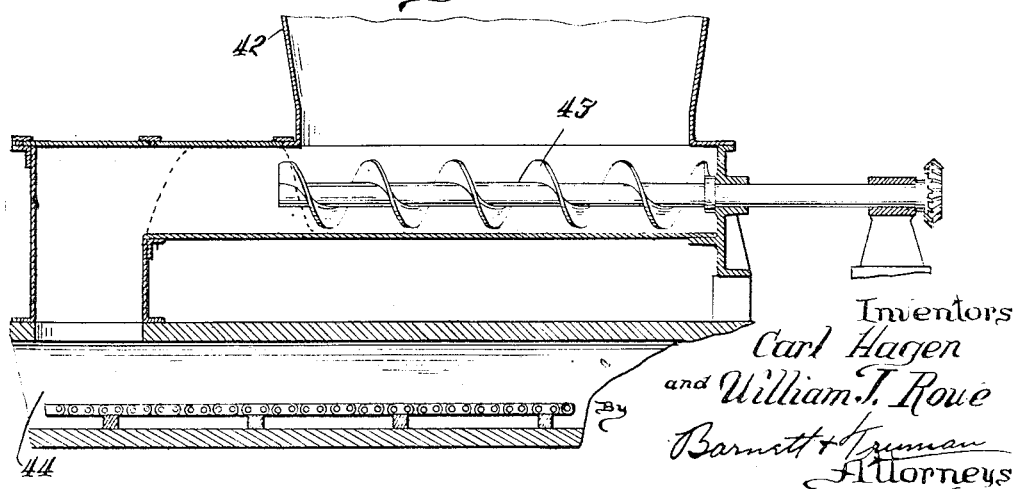

Inventors
Carl Hagen
and William J. Rowe
By Barnett & Truman
Attorneys.

Patented Sept. 19, 1933

1,927,313

UNITED STATES PATENT OFFICE

1,927,313

APPARATUS FOR DRYING STARCH

Carl Hagen, Park Ridge, and William J. Rowe, Chicago, Ill., assignors to International Patents Development Company, Wilmington, Del., a corporation of Delaware Application July 13, 1931. Serial No. 550,470

7 Claims. (Cl. 34—6)

This invention relates to improvements in apparatus for drying starch and other materials of similar character.

The principal object of the invention is to provide an apparatus in which starch may be dried by a continuous process, that is to say, by causing the starch to pass through inclined rotary driers wherein it is showered through heated air. The moist starch as it comes from the starch tables or from washing filters has a lumpy sticky character which tends to adhere to the conveying and drying mechanism. The adhesion of the starch to the conveyor trough as it is moved therethrough by impellers, has a tendency to roll a portion of the starch into relatively hard elongated pellets which do not readily break up in the drier and have to be screened out of the finished product. The present invention includes the provision of mechanism which overcomes the above mentioned objections heretofore encountered in drying starch by a continuous process and particularly those objections encountered in connection with the use of rotary drum driers used either singly or in tandem.

The use of rotary drying drums has not, heretofore, been considered feasible for drying of starch, since the damp starch has a tendency to cling to the vanes of the drum and form into balls which become dry and hard on the surface, but contain an objectionable amount of moisture in the interior. The present invention overcomes such difficulty by providing means for introducing dry starch into the wet starch conveyor and, with the drying air, into the receiving end of the first or initial drier. The dry starch prevents the moist starch from adhering to the conveyor and also serves to form a dry coating on the moist starch which prevents it from clinging to the walls and vanes of the drying drum, and thereby insures a more thorough breaking up of the starch as it moves through the drying drum.

Another and more specific object is to provide efficient heating and air circulating means for causing the air to pass through the drying chambers, the arrangement and construction of the air circulating means being such as to seal the apparatus against the escape of dust ladened air into the atmosphere. In this connection the invention contemplates the provision of suitable header chambers which communicate with opposite ends of revolving drier drums and to provide novel means for forming air sealed connections between the headers and drums. In order to provide proper circulation of air through the driers, the invention also includes conveyors which are so arranged and constructed that the material forwarded thereby collects in or chokes the discharge end thereof so as to form air seals.

A further object is to provide an arrangement whereby a substantially uniform volume of air is passed through the driers in the direction of movement of the material and is maintained at a desired temperature to effect rapid drying of the starch without gelatinization thereof.

The invention is illustrated in a preferred embodiment in the accompanying drawings, wherein:

Fig. 1 is an end view of the drying apparatus.

Fig. 2 is a plan view of the same.

Fig. 3 is a sectional view taken on an irregular line through the inlet end of the initial drying drum, the said section being taken on line 3—3 of Fig. 2 passing through the two air conduits and also through the feed conveyor.

Fig. 4 is a fragmentary sectional view taken on line 4—4 of Fig. 3, and showing in side elevation the operating mechanism for the feed conveyor.

Figure 5:
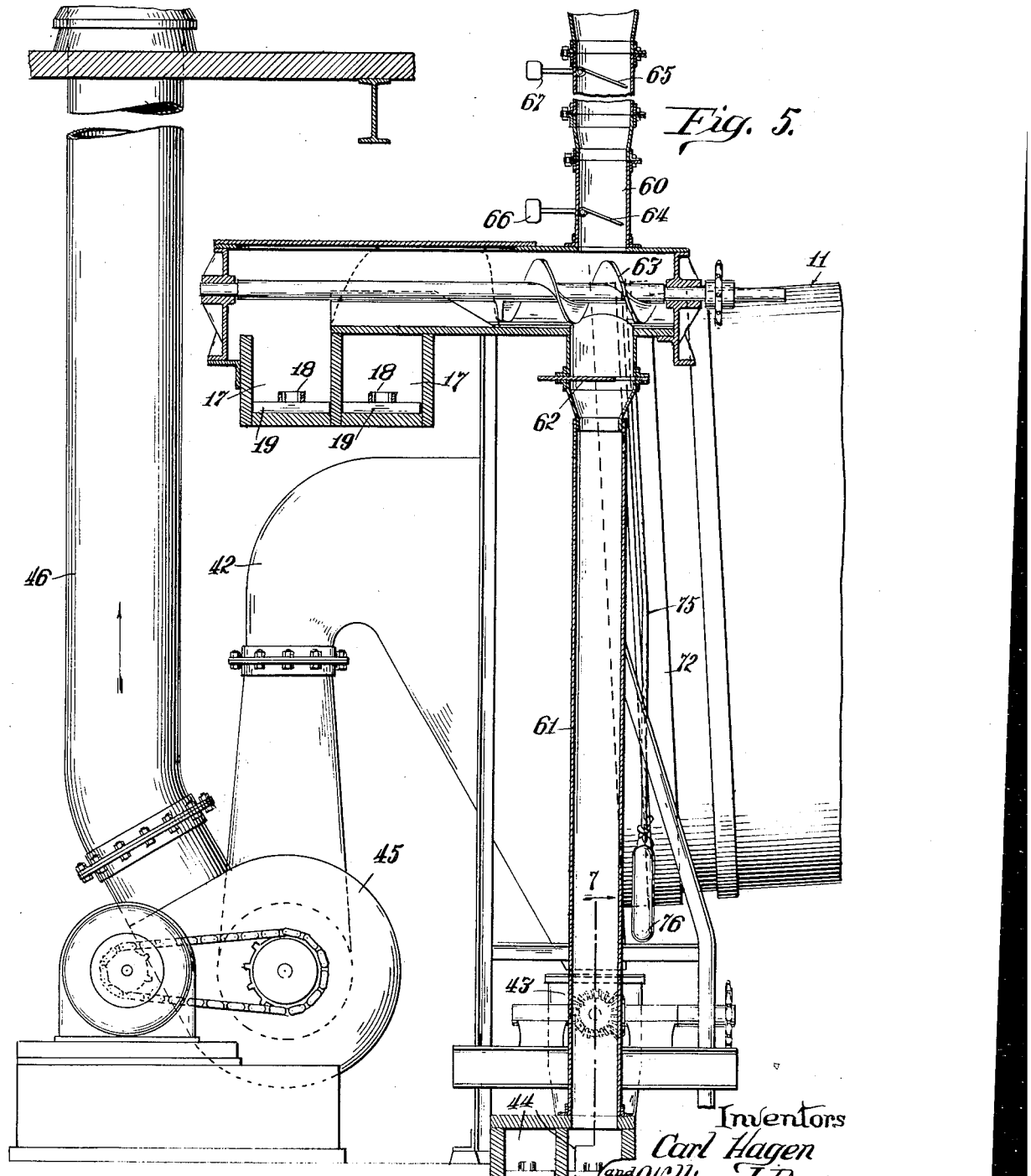

Fig. 5 is a vertical sectional view taken on line 5—5 of Fig. 2 and showing in elevation the discharge end of the finishing drier drum, the conduits and conveyors shown in section in this figure being that portion of the apparatus used for forwarding dry starch to the wet starch conveyor and for also directing a portion of the dry starch removed from the air issuing out of the finishing drier to the dried starch conveyor.

Fig. 6 is a general schematic view of the apparatus as a whole.

Fig. 7 is a sectional view taken through the conveyor disposed at the discharge end of the finishing drier, said sectional view being on line 7—7 of Fig. 5.

Figure 8:
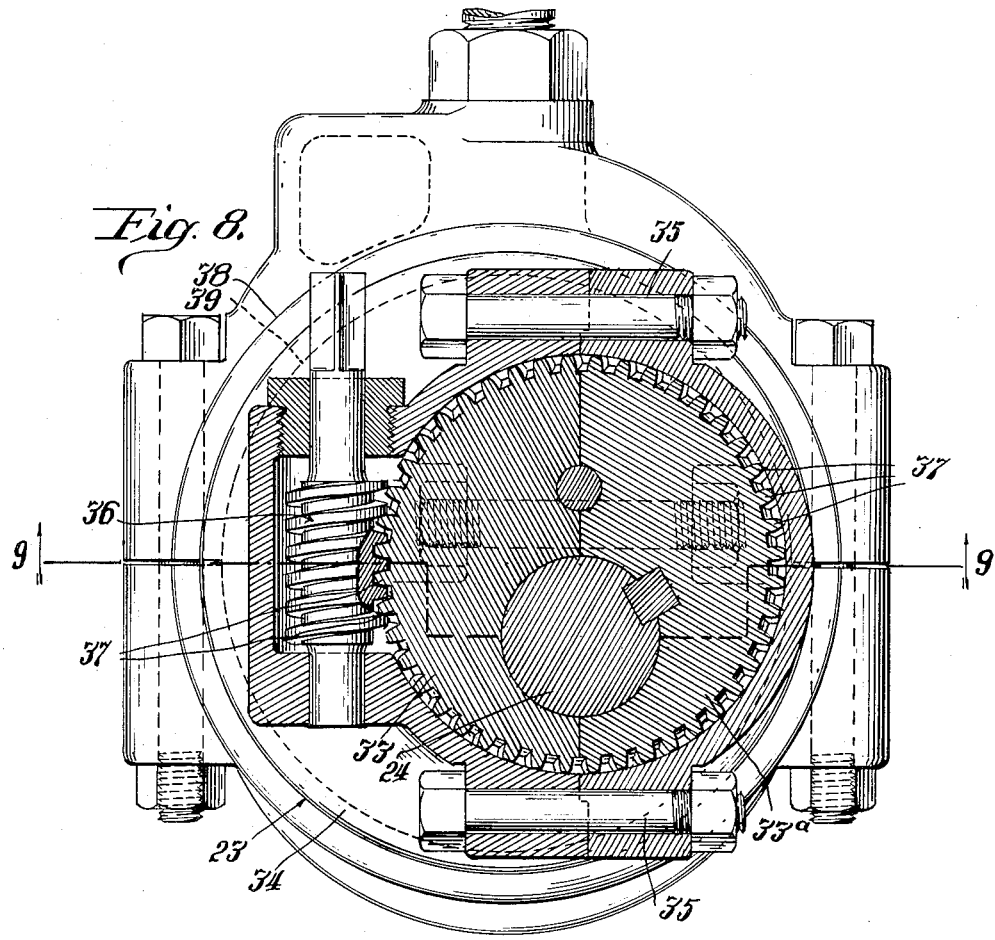
Figure 9:
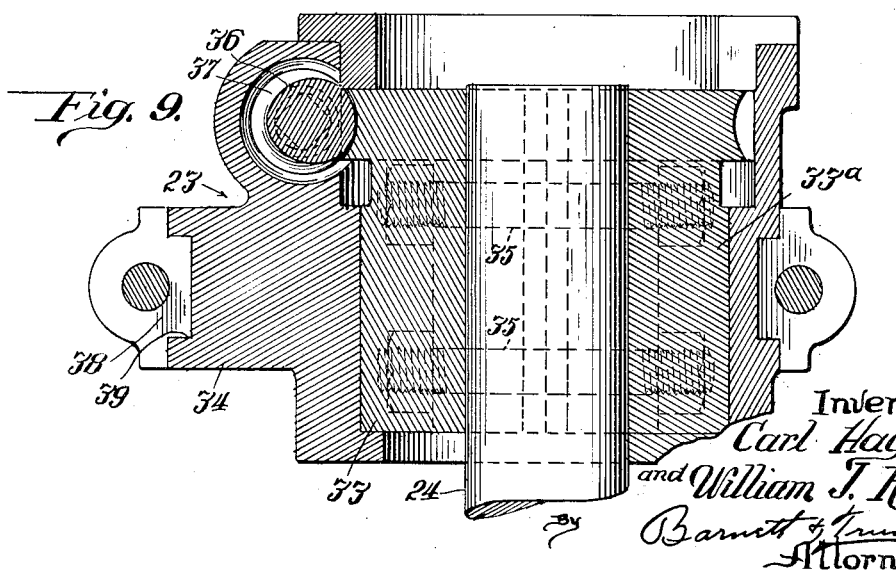

Fig. 8 is a sectional view taken through the eccentric mechanism for operating the feed conveyor; the said section being on line 8—8 of Fig. 3; and Fig. 9 is a sectional view taken on line 9—9 of Fig. 8.

The drying apparatus includes two rotary inclined drying drums 10 and 11. The drum 10 receives the wet starch as it comes from the settling tables or from washing filters. The starch as it passes through drum 10 is partially dried and is then introduced into the finishing drier 11. The drums 10 and 11 are each supported on suitable rollers 13 and operated by means of a power unit 14 which includes a pinion 15 adapted to mesh with the large gear 16 extending around the drum.

The starch as it comes from the starch tables or from the washing filters is conveyed by means of a drag conveyor 17 toward the inlet end of the drying drum 10. The drag conveyor preferably consists of two trough sections disposed in the same horizontal plane. An endless chain 18 is operatively supported in said troughs and is provided with a plurality of impeller vanes 19 for imparting a forward movement to the starch. Communicating with one side of the drag conveyor 17 is a screw conveyor for receiving the starch from the drag conveyor and feeding it into the inlet end of the drying drum 10. This screw conveyor consists of a conduit 20 which communicates with the bottom portion of the drag conveyor 17, and a screw impeller 21 adapted to feed the material into the inlet end of the drum 10. The impeller screw 21 is operated by driving mechanism which imparts intermittent rotational movements to said screw. The said driving mechanism comprises a motor 22, an eccentric 23 on the shaft 24 of the motor, a ratchet wheel 25 on the screw impeller shaft 26, and a pawl 27 carried at the upper end of an eccentric rod 28. The said pawl 27 is preferably pivoted between the arms of a U-shaped member 29 at the upper end of the eccentric rod and is weighted, as indicated at 30, to maintain the pawl in engagement with the ratchet 25. Arms 31—31 journaled on the screw shaft 26 at opposite sides of the ratchet wheel are pivotally connected to the arms of said U member 29 so as to maintain the axis 32 of the pawl at a fixed distance relative to the ratchet wheel. The eccentric 23 (see Figs. 8 and 9) is adjustable so as to vary its throw and consequently vary the amplitude of the rotational movements imparted to the screw impeller 21, and thereby vary the amount of material fed into the drum 10. Said adjustment makes it possible to so regulate the feed of the material into the drum 10 as to accurately control the amount of moisture in the finished product without varying the temperature or volume of air passing through the driers. The said eccentric 23 consists of a two-piece center member 33—33a having a fixed eccentric position on the motor shaft 24 and an outer ring member 34 adjustably supported on the center member. The outer ring member 34 is preferably formed in two parts, bolted together by bolts 35—35. A worm 36 carried by the outer ring member 34 meshes with worm gear teeth 37 formed on the center member 33. An eccentric strap 38 is fitted in a groove 39 of the ring member 34. It will be seen from the above description that rotation of the worm 36 moves the outer ring member 34 relative to the center member 33 so as to vary the throw of the eccentric as a whole. By varying the said eccentric, the movements of the pawl 27 and the ratchet 25 are correspondingly varied to regulate the feed of material. The drier 10 is provided with longitudinally extending vanes 39 which lift the starch during the rotation of the drum and shower it through the heated air circulated, as hereinafter described, through the drum to evaporate the moisture in the starch. The starch, after being partially dried, is discharged from the drum 10 into a header chamber 40 communicating with an inclined drag conveyor 41 which delivers the partially dried starch into the upper end of the inclined drum 11. The starch is then caused to move thru the drum 11, being showered through the heated air as in drier 10, and is discharged at its lower end into a header chamber 42 which communicates with a screw conveyor 43. This conveyor moves the starch from the discharge end of the drum and delivers it into a drag conveyor 44 which transports the dry starch to a suitable place for packing or storage.

The heated air for drying the starch is preferably caused to pass through the drums 10 and 11 in the direction of movement of the starch. The main source of heated air enters through filter B and heater C into the receiving end of the finishing drier 11 so as to come into contact with the damper portions of the partially dried starch and thereby effect a rapid evaporation of the moisture. By introducing the main supply of heated air into the starch inlet end of the drying drum 11, rapid evaporation of moisture ensues. Consequently the temperature of air is reduced as it moves toward the discharge end and into contact with the drier particles of starch and thereby avoids gelatinization of the starch since a certain amount of moisture as well as high temperature is necessary for gelatinization. The air is drawn into the drier 11 through the air filter B and air heater C by means of a fan 45 the casing of which communicates with the upper portion of the header chamber 42 at the discharge end of the drum. The air issuing from the finishing drier 11 is passed through a pipe 46 into a cyclone separator 47 wherein the major portion of the dry starch held in suspension is removed from the air. While the major portion of the dry starch is removed from the air passing through the cyclone separator 47, a considerable amount of starch dust remains in suspension in the air and is introduced into the initial drum 10 by means of the pipe 48 which communicates with the inlet end of the initial drier at a location near the point where the wet starch is introduced. The low humidity of air issuing out of the finishing drier 11 makes it practical to employ this air as a drying medium in the initial drier 10. While the major portion of the starch is removed from this air before it issues out of the cyclone separator 47, the air, nevertheless, holds in suspension a considerable amount of very dry dust-like starch which is collected by coming into contact with the wet starch in the initial drier. This starch dust tends to provide a dry coating for the wet starch introduced into the initial drier and thereby prevents it from adhering to the walls and lifting vanes of the drier. The air from the finishing drier enters the initial drier at approximately 150° F. In order to increase the volume and temperature of this dust ladened air, an auxiliary air heater 49 and air filter 50 are arranged to communicate with the inlet end of drum 10 by means of a conduit 51. The dust ladened air entering the drier 10 through pipe 48 together with the air from the booster heater 49 commingle to effect a rapid evaporation of the wet starch introduced. Preferably the booster heater 49 is controlled by damper 52 to supply additional air at such volume and temperature that the auxiliary air together with the dust ladened air entering the initial drier will so dry the starch therein that the partially dried starch when passed through the finishing drier will only reduce the temperature of the air issuing out of said finishing drier 11 to approximately 150° F. The circulation of air through the initial drier 10 is produced preferably by means of a fan 53 communicating with the header 40 at the discharge end of the initial drier. The air issuing out of the initial drier passes through the pipe 54 to a cyclone separator 55 in which the starch particles in suspension are removed. The air passes out of the cyclone separator 55 through a pipe 56 and enters the lower end of a wet dust collector 57 having a liquid outlet 58 and an air outlet 59. The wet collector 57 may be of any suitable or preferred construction, whereby all of the starch dust is removed from the air before the air escapes to the atmosphere. The heavier starch dust recovered from the air in the cyclone separator 55 is passed through a pipe 59 to the drag conveyor 41 and is introduced, along with the partially dried material from the initial drier 10, into the finishing drier.

The dry material collected by the cyclone collector 47 is sent two ways. About two-thirds of it, more or less, goes by pipes 60 and 61 to the drag conveyor 44 which receives the finished starch from the finishing drier 11. A valve 62 is located in the pipe 61 to regulate the amount of material passing therethrough. The other portion of the material discharged from the collector 47 is forwarded by a screw conveyor 63 to the return side of the wet starch conveyor 17, the said starch serving to provide a protective layer of dry starch to prevent the wet starch from adhering to the trough and impellers of the conveyor. The said dry starch ultimately mixes with the damp starch conveyed in said conveyor and forms a dry coating about particles thereof, so that when the starch is introduced into the initial drier 10 it has less tendency to adhere to the walls of the drier. The screw conveyor 63 and also the screw conveyor 43 are each constructed so that the forwarding screw stops short of the discharge end of the conveyor, thereby permitting the dry material to collect in the discharge end of the conveyor, as indicated in dotted lines in Figs. 5 and 7, so as to provide an air seal. Further sealing of the air at the discharge end of the collector 47 is effected by means of feed gates 64, 65 disposed in the pipe 60 and normally held in closed position by weighted arms 66, 67, respectively. The screw conveyors and likewise the drag conveyors may be operated by any suitable mechanism. Preferably the screw conveyors 43 and 63 are driven by means of sprocket chain connections 68 and 69 with a rotating part of the mechanism for operating the drier drum 11. The wet starch drag conveyor is operated preferably by means of a motor 70 and a sprocket chain connection 71.

In order to avoid loss of air as it passes through the drying drums, an air seal connection is provided between the ends of each drum and the stationary header or closure therefor. The air seal in each case consists of a flexible collar 72 fixed to the stationary portion of the closure or header, for example, the closure 73 shown in Fig. 3. The collar overlaps a sealing band member 74 secured to the end of the drum. A flexible constricting member, consisting of a cable 75 is secured at one end to a stationary member and is wrapped about the outer face of the collar 72. The other end of the constricting member 75 is provided with a weight 76 which serves to hold the constricting member taut and thereby holds the flexible collar in air-sealing contact with the sealing rings 74.

A summary of the operation of the apparatus is as follows, reference being made particularly to the schematic illustration of the apparatus shown in Fig. 6. In this figure the full lines provided with the direction arrows indicate the travel of the starch through the driers; the portions of these lines designated 17, 41 and 44 represent the drag conveyors above referred to. The broken lines provided with the arrows indicate the course of the air through the heaters and drying drums. The starch from the starch tables or from a washing filter designated A, is conveyed by the conveyor 17 to the initial drying drum 10, through which the starch passes and discharges out of the lower end upon the drag conveyor 41. This conveyor carries the starch to the inlet end of the finishing drier 11, through which it passes and is discharged at the lower end thereof, upon the drag conveyor 44. The main supply of air enters through the air filter B and heater C into the upper end of the finishing drier 11, the air being caused to pass through the drier by means of the fan 45 which functions to deliver the air ladened with starch dust into the cyclone collector 47. Part of the material collected by the collector 47 is passed through pipes 60 and 61 to the drag conveyor 44, another portion of the said starch is passed through the screw conveyor 63 to the wet starch drag conveyor 17. The air issuing out of the collector 47 is directed through pipe 48 into the inlet end of the initial drier 10, wherein it comes into contact with the wet starch. A quantity of heated air is also introduced into the inlet end of the initial drier from the auxiliary filter 50 and air heaters 49, the additional heated air serving to increase the volume and the temperature of the air passing through the initial drier. The air and starch dust held in suspension therein are withdrawn from the initial drier by means of a fan 53 which directs the air and starch dust into a cyclone separator 55. The material separated in this way in this collector is directed through pipe 59 to the conveyor 41 which conveys it, along with the partially dried starch from the initial drier, into the inlet end of the finishing drier. The air issuing out of the cyclone collector 55 is passed by pipe 56 into a wet collector 57, which removes all of the starch dust before the air is discharged into the atmosphere. The liquid from the wet collector 57 is discharged through the outlet 58.

We claim:

1. In drying apparatus, the combination of an initial drier consisting of an inclined rotary drum through which the material is moved from end to end by gravity and rotation of the drum, a finishing drier of like construction, means for conveying material discharged by gravity from the lower end of the initial drier to the upper end of the finishing drier, means for causing heated air to pass first through the finishing drier, and then through the initial drier, a dust collector for removing a portion only of the material suspended in the air issuing out of the finishing drier, a conduit for directing the dust ladened air issuing out of said collector directly to the receiving end of said initial drier, a conveyor for delivering material to the initial drier means for introducing a portion of the material collected in said dust collector into said conveyor, and means for directing the other portion of said collected material to the main body of material discharged from the finishing drier.

2. In drying apparatus, the combination of an initial drier consisting of an inclined rotary drum through which the material is moved from end to end by gravity and rotation of the drum, a conveyor for feeding the damp material in said drier, a finishing drier similar in construction to the initial drier, a conveyor for receiving material from the discharge end of the initial drier and introducing said material into the finishing drier, means for causing heated air to pass first through the finishing drier in the direction of movement of the material therethrough, and then through the initial drier in the direction of movement of material therethrough, a dust collector for removing a portion of the material suspended in the air issuing out of the finishing drier, means for delivering a portion of the collected material into the first mentioned conveyor to be mixed with the damp material and introduced into the receiving end of the initial drier, means for augmenting the volume and temperature of the dust-ladened air issuing out of said collector and directing said air into the receiving end of the initial drier, a dust collector for collecting the material in suspension in the air issuing out of the initial drier, means for directing the material collected therein to the conveyor leading to the receiving end of the finishing drier, and a wet collector for removing the residue of material in suspension from the air issuing out of the last mentioned dust collector.

3. In a drying apparatus, the combination with a rotary drying drum, a conveyor for feeding damp material into the receiving end of said drum, a second rotary drying drum, a conveyor for transporting partially dried material from the first drum to the second drum, means for heating air and causing it to circulate through said drums, a dust collector for removing the material suspended in the air issuing out of the second drum, and means for directing a portion of the material collected to the damp material conveyor comprising a conduit communicating with the outlet of said dust collector and with the damp material conveyor, a forwarding screw journaled in said conduit for moving the material toward the wet material conveyor; said forwarding screw being formed to stop short of the delivery end of said conduit whereby the material fed therethrough collects at said delivery end to form an air seal for the conduit.

4. In drying apparatus, the combination of a pair of rotary drying drums through which material and air is caused to pass, a conveyor for conveying wet material to the inlet end of one of said drums, and conveyor for conveying the dry product as it is discharged from the discharge end of one of said drums, a dust collector for removing the material in suspension from the air issuing out of the second drum, means for directing a portion of said collected material to the damp material conveyor comprising a conduit communicating with the discharge end of said collector and with said wet material conveyor, a forwarding screw disposed in said conduit but stopping short of the discharge end thereof whereby the material moved toward the wet conveyor collects in the discharge end of said conduit to form an air seal, and means for directing a portion of said collected material to the dry material conveyor.

5. In drying apparatus, the combination of a pair of rotary drying drums through which material and air is caused to pass, a conveyor for conveying wet material to the inlet end of one of said drums, and a conveyor for conveying the dry product as it is discharged from the discharge end of one of said drums, a dust collector for removing the material in suspension from the air issuing out of the second drum, means for directing a portion of said collected material to the damp material conveyor comprising a conduit communicating with the discharge end of said collector and with said wet material conveyor, a forwarding screw disposed in said conduit but stopping short of the discharge end thereof whereby the material moved toward the wet conveyor collects in the discharge end of said conduit to form an air seal, means for directing a portion of said collected material to the dry material conveyor comprising a conduit communicating with the entrance end of said screw conveyor and with said dry material conveyor, and a valve interposed in said conduit to control the flow of material.

6. In drying apparatus, the combination of an initial drying drum, a supply conveyor for conveying material from a source of supply toward said drum, a screw conveyor for receiving material from said supply conveyor and feeding it into the initial drying drum, a finishing drying drum, a conveyor for delivering material from the discharge end of the initial drier to the receiving end of the finishing drier, a finished product conveyor at the discharge end of the finishing drier, a screw conveyor for delivering the material from the finishing drier to the last named conveyor and comprising a closed conduit and a forwarding screw therein the latter of which stops short of the discharge end of said conduit whereby the accumulation of material at the said discharge end of said conduit serves as an air seal, means for causing heated air to pass through said driers, a cyclone dust collector for collecting the material in suspension issuing out of the finishing drier, a screw conveyor comprising a conduit communicating with the discharge end of said dust collector and with the supply conveyor, a forwarding screw in said conduit which stops short of the discharge end of said conduit whereby the material collects in said discharge end to form an air seal.

7. In drying apparatus, the combination of an initial drying drum, a supply conveyor for conveying material from a source of supply toward said drum, a screw conveyor for receiving material from said supply conveyor and feeding it into the initial drying drum, a finishing drying drum, a conveyor for delivering material from the discharge end of the initial drier to the receiving end of the finishing drier, a finished product conveyor at the discharge end of the finishing drier, a screw conveyor for delivering the material from the finishing drier to the last named conveyor and comprising a closed conduit and a forwarding screw therein the latter of which stops short of the discharge end of said conduit whereby the accumulation of material at the said discharge end of said conduit serves as an air seal, means for causing heated air to pass through said driers, a cyclone dust collector for collecting the material in suspension issuing out of the finishing drier, a screw conveyor comprising a conduit communicating with the discharge end of said dust collector and with the said supply conveyor, a forwarding screw in said conduit which stops short of the discharge end of said conduit whereby the material collects in said discharge end to form an air seal, and means for directing a portion of the material collected to the finished product conveyor at the discharge end of the finishing drier.

CARL HAGEN.
WILLIAM J. ROWE.